United States Patent [19]

Atkinson

[11] Patent Number: 5,040,830

[45] Date of Patent: Aug. 20, 1991

[54] REFRIGERATION HOSE AND HOSE COUPLING

[76] Inventor: Ward J. Atkinson, 3423 E. Marlette Ave., Paradise Valley, Ariz. 85253

[21] Appl. No.: 459,945

[22] Filed: Jan. 2, 1990

[51] Int. Cl.⁵ ............................................. F16L 33/01
[52] U.S. Cl. ................................. 285/256; 285/331; 138/109; 138/137
[58] Field of Search ............... 285/256, 257, 258, 259, 285/149, 331; 138/109, 137, 125, 126

[56] References Cited

U.S. PATENT DOCUMENTS

| | | | |
|---|---|---|---|
| 2,008,650 | 7/1935 | Weatherhead, Jr. | 285/256 |
| 2,211,622 | 8/1940 | Hunziker | 285/256 X |
| 4,196,464 | 4/1980 | Russell | 138/109 X |
| 4,289,554 | 9/1981 | Reicherts et al. | 52/309.13 X |
| 4,510,974 | 4/1985 | Natori et al. | 138/137 |
| 4,842,024 | 6/1989 | Palinchak | 138/137 X |
| 4,881,576 | 11/1989 | Kitami et al. | 138/137 X |
| 4,907,625 | 3/1990 | Ito et al. | 138/137 X |

Primary Examiner—Dave W. Arola
Assistant Examiner—Heather Chun
Attorney, Agent, or Firm—Jordan M. Meschkow; Don J. Flickinger

[57] ABSTRACT

A transmission component for a refrigeration or other fluid system having a hose constructed with a moisture barrier, a refrigerant barrier and a reinforcement layer, and a hose coupling. The hose coupling has a cap seal which fits over the end of the hose to seal it, and a shell assembly having an outer shell which fits over the hose end and cap seal, and a hose tube which enters the hose through the cap seal.

11 Claims, 1 Drawing Sheet

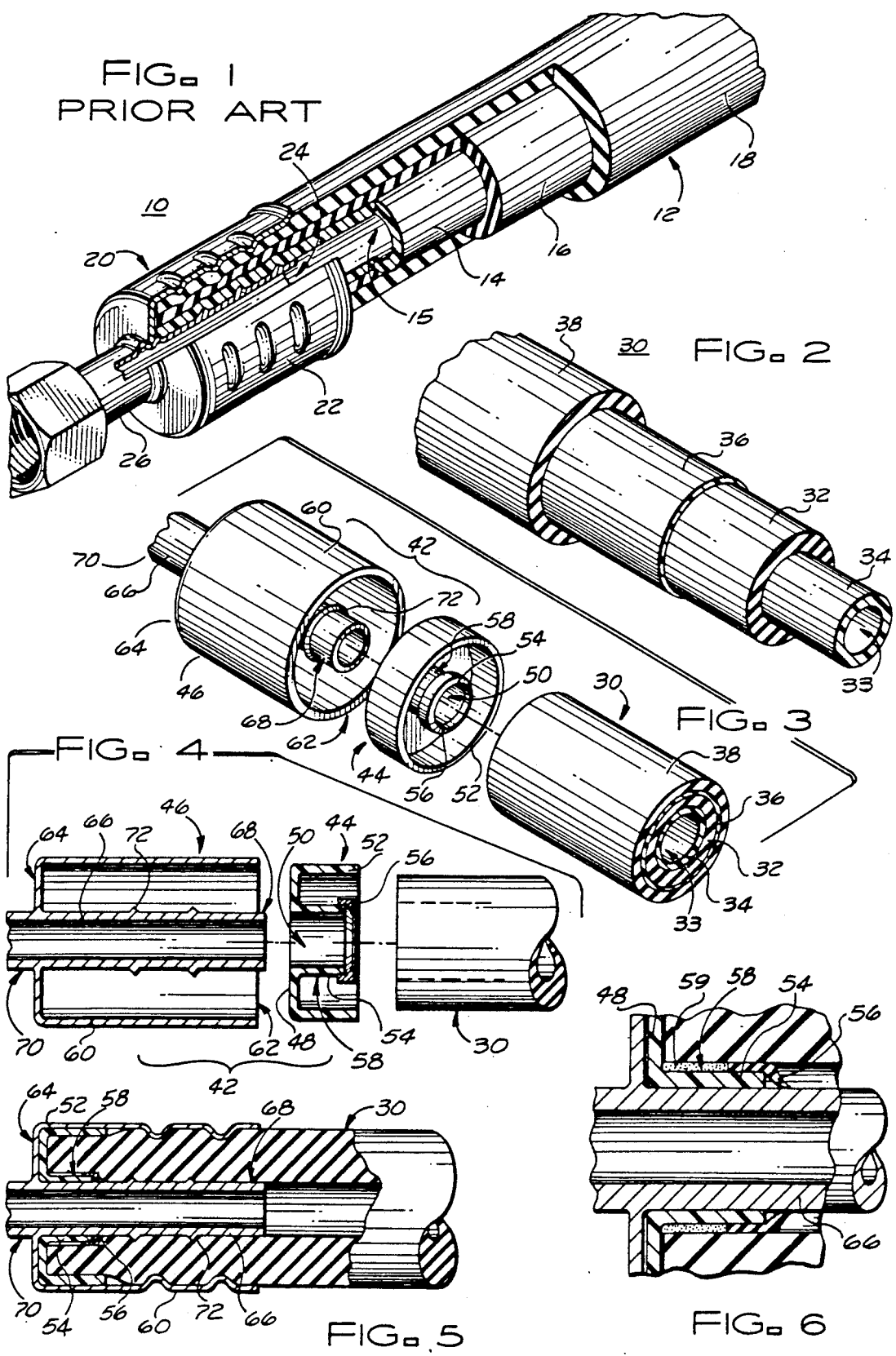

REFRIGERATION HOSE AND HOSE COUPLING

BACKGROUND OF THE INVENTION

1. Field of the Invention

This invention pertains to refrigerant transmission components for refrigeration systems.

More particularly, the present invention pertains to the hoses and hose couplings of a refrigeration system.

2. Prior Art

Components for the transmission of refrigerant in refrigeration systems are well known. Typically, hoses or rigid pipes are used to contain the refrigerant. The transmission components must contain the refrigerant and facilitate its transmission between components. Transmission components must also prevent atmospheric moisture from penetrating to the refrigerant.

Closed systems using rigid pipes have the most effective prevention of moisture penetration. However, in mobile systems, such as those used in vehicles, rigid pipes cannot be used. Mobile air-conditioning systems have a compressor mounted to the engine and other components mounted to the vehicle's body. A transmission component is needed to contain the refrigerant and facilitate transmission between components. Rigid piping, while effectively containing the refrigerant, does not allow for movement between the component attached to the engine and the components attached to the vehicle's body. Also, the rigid pipe acts as a noise transmission source.

In the prior art, hoses are used to transmit and contain refrigerant in mobile refrigeration systems. To sufficiently contain the refrigerant the hoses are commonly constructed from thick walled, substantially rigid nylon tubing. The hose is flexible enough to accommodate the engine motion and allow some routing in the engine compartment. However, it still acts as a noise transmission source and deforms when subjected to sharp bends. Further, this type of hose has been known to have a problem with internal material flaking.

Some prior art hoses attempt to prevent moisture from penetrating by coating the hoses. The coating is typically rubber, which increases the thickness of the hose and adds to the routing and noise transmission problems. Other refrigeration systems attempt to offset the moisture problem by adding a drying material.

In the prior art, hoses are coupled to the components of the refrigeration system by metal couplings. A great deal of refrigerant leakage occurs at the coupling end, where the hose is attached to the rigid pipe of a component.

Since the currently used refrigerant has been determined to negatively affect the earth's ozone layer, new refrigerants are being sought. Many new refrigerants, such as R-134a, have both a greater problem for containment and for moisture absorption.

It would be highly advantageous, therefore, to remedy the foregoing and other deficiencies inherent in the prior art.

Accordingly, it is an object of the present invention to provide a new and improved refrigeration hose and hose coupling.

Another object of the invention is to provide a hose for containing refrigerant or other fluid.

And another object of the present invention is to provide a hose that prevents moisture penetration.

Still another object of the invention is to provide a flexible hose.

Yet another object of the present invention is to provide a hose which will not transmit noise.

Yet still another object is to provide a hose which may be easily routed in an engine compartment.

A further object of the invention is to provide a hose coupling which prevents leakage of the contained fluid.

SUMMARY OF THE INVENTION

Briefly, to achieve the desired objects of the instant invention in accordance with a preferred embodiment thereof, provided is a hose and a hose coupling. The hose has a refrigerant containing barrier and a moisture excluding barrier. The hose coupling has a cap seal which fits over the cut end of the hose to prevent refrigerant leaks and an outer shell. The cap seal is a semi-rigid construction containing a lip seal and a sealant space for bonding the cap to the inner surface of the hose.

BRIEF DESCRIPTION OF THE DRAWINGS

The foregoing and further and more specific objects of the present invention will become readily apparent to those skilled in the art from the following detailed description of a preferred embodiment thereof taken in conjunction with the drawings, in which:

FIG. 1 is a sectional perspective view of a prior art hose and hose coupling;

FIG. 2 is a sectional view of a hose constructed in accordance with the teachings of the present invention;

FIG. 3 is an exploded view of the hose and hose coupling constructed in accordance with the teachings of the present invention;

FIG. 4 is a sectional view of the coupling illustrated in FIG. 3;

FIG. 5 is a sectional view of the hose coupled to the hose coupling; and

FIG. 6 is an enlarged sectional view of the inner portion of the cap seal coupled to the hose.

PREFERRED EMBODIMENT OF THE PRESENT INVENTION

Turning now to the drawings in which like reference characters indicate corresponding elements throughout the several views, attention is first directed to FIG. 1 which illustrates a prior art hose and coupling, herein chosen for purposes of reference and orientation as a refrigeration hose and hose coupling generally designated 10. A hose 12 consists of an inner layer 14 usually a rubber material to prevent entry of moisture. Inner layer 14 defines an opening 15 through which a refrigerant material is transmitted. A middle layer 16 covers inner layer 14 and is constructed of a thick layer of nylon. The nylon prevents refrigerant from escaping and provides a structure to hose 12. An outer layer 18 of nylon coated rubber protects inner layer 14 and middle layer 16, and contributes to refrigerant containment and moisture exclusion. Due to the thickness of middle layer 16, hose 12 is substantially rigid making noise transmission a problem. Further, during routing in the engine compartment, bends in hose 12 cause deformation and kinking.

In FIG. 1 the prior art hose coupling 20 consists of a shell 22 which fits over the end of hose 12 and is crimped in place. Shell 22 has an opening 24 which corresponds to opening 15 of hose 12. A tube 26 having a plurality of ribs 28 is inserted through opening 24 and into opening 15 of hose 12. Tube 26 is coupled to the rigid pipes of a refrigeration component. Shell 22 and tube 26 do not form seals sufficient to prevent leakage of refrigerant from the cut end of hose 12.

FIG. 2 illustrates the preferred embodiment of a hose 30 of the present invention. Hose 30 has a reinforcement layer 32 which provides a structure to hose 30. Reinforcement layer 32 is constructed of a flexible material. A variety of materials may be used since reinforcement layer 32 need not have any moisture exclusion or refrigerant containment properties. A refrigerant barrier 34 has been applied to the inner surface of reinforcement layer 32. Refrigerant barrier 34 is a thin plastic material such as nylon fiber which contains the refrigerant and defines a hose opening 33 through which the refrigerant is transmitted. A moisture barrier 36 has been applied to the outer surface of reinforcement layer 32. In this embodiment, moisture barrier 36 is a thin polyvinylidene chloride which prevents moisture from penetrating to the refrigerant. Refrigerant barrier 34 and moisture barrier 36 are both sufficiently thin to remain flexible and are supported by reinforcement layer 32. A protective cover 38 protects the inner layers of hose 30 from the environment and in this embodiment is an elastomer-butyl material. Those skilled in the art will understand that hose 30 may be used for containment of materials, especially fluids, other than refrigerant.

Accordingly, refrigerant barrier 34 may be referred to as a liquid barrier and fabricated of a material chosen to be inert to and contain the selected fluid. Exemplary fluids are gases, such as oxygen or compressed, as liquids, such as hydraulic fluid or combustionable fuel.

Since refrigerant barrier 34 and moisture barrier 36 are thin films of material on reinforcement layer 32, the flexibility of reinforcement layer 32 is not effected. Also, protective cover 38 is constructed of a flexible material resulting in hose 30 being flexible. This flexibility will greatly reduce noise transmission and will allow for easier hose routing in the engine compartment. Thus, a flexible hose 30 which contains the transmitted material and prevents ingression of unwanted contaminates, such as moisture, is provided.

FIG. 3, 4 illustrate a section of hose 30, described previously and illustrated in FIG. 2, and a hose coupling 42 forming a transmission component for a refrigeration or other fluid system. Hose coupling 42 has a hose cap seal 44 and a shell assembly 46.

Cap seal 44 is constructed of a semi-rigid material which fits over the cut end of hose 30. A disk shaped base 48 defining a seal opening 50, fits flush against the cut end of hose 30. Seal opening 50 corresponds to hose opening 33. An outer wall 52 extends perpendicularly from the outer edge of base 48 and when coupled to base 30 encloses protective cover 38. A concentric inner wall 54 extends perpendicularly from the inner edge of base 48 and encircles seal opening 50. When coupled to hose 30, inner wall 54 extends into hose opening 33. As shown in FIG. 6, a lip seal 56 is coupled to the outer surface of inner wall 54 and extends across seal opening 50. A sealant space 58 is formed on the outer surface of inner wall 54 by lip seal 56. Sealant space 58 contains a sealant means 59 which may be an "o" ring, sealant material or other sealant which bonds and seals inner wall 54 to the inner surface of moisture barrier 36. Outer wall 52 and inner wall 54 securely attach to hose 30 and form an effective seal, leaving only seal hole 50 as an exit for the refrigerant.

As illustrated in FIG. 3 and 4, shell assembly 46 has an outer shell 60, generally cylindrical in shape, with an open end 62 and a closed end 64. A hose tube 66 extends centrally from closed end 64 of outer shell 60. A first end 68 of hose tube 66 extends towards open end 62 and a second end 70 extends opposite first end 68. Hose tube 66 provides a passage through outer shell 60.

Open end 62 of outer shell 60 fits over the end of hose 30 and cap seal 44 as illustrated in FIG. 5. Outer shell 60 is crimped in place, further securing cap seal 44. A plurality of hose barbs 72 are formed on the outer surface of hose tube 66. When outer shell 60 is placed over the end of hose 30 and cap seal 44 hose tube 66 is inserted through seal opening 50 and into hose opening 33. Barbs 72 secure hose tube 66 in hose 30 and help prevent escape of refrigerant. As hose tube 66 passes through seal hole 50 enlarged in FIG. 6, lip seals 56 close around it and form a seal preventing loss of refrigerant. Second end 70 of hose tube 66 is coupled to a component of a refrigerant system. There are many methods known to those skilled in the art which will work satisfactorily.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A transmission component for use in a liquid system comprising:
   a hose; and
   a hose coupling having,
      a cap seal coupled to an end of said hose, said cap seal including
      a base defining a seal opening,
      an outer wall extending axially from said base,
      an inner wall extending from said base concentric to said outer wall and encircling said seal opening,
      a lip seal bonded to said inner wall and extending across said seal opening, and
      a sealant space defined by said lip seal and said inner wall and containing sealing means for sealing said inner wall to the inner surface of said hose; and
   a shell assembly fitting over said cap seal and hose end, and crimped in place.

2. A device as claimed in claim 1 wherein said hose further comprises:
   a reinforcement layer;
   a liquid barrier defining a hose opening bonded to said reinforcement layer;
   a moisture barrier bonded to said reinforcement layer, and a protective cover encircling said reinforcement layer, said moisture barrier and said liquid barrier.

3. A hose claimed in claim 2 wherein said liquid barrier is a nylon fiber.

4. A hose as claimed in claim 2 wherein said moisture barrier is a polyvinylidene chloride film.

5. A device claimed in claim 1 wherein said shell assembly further comprises:
   an outer shell having an open end and a closed end;

a hose tube extending through said closed end of said outer shell and into said hose concentric to said inner surface; and said hose tube having a plurality of hose barbs on its outer surface.

6. A hose for transmission of materials consisting of:
a liquid barrier defining a hose opening; a reinforcement layer directly bonded to said liquid barrier;

a moisture barrier directly bonded to said reinforcement layer, said moisture barrier comprising a seamless, non-porous, flexible film of moisture-excluding material; and a protective cover directly encircling said moisture barrier, and indirectly encircling said reinforcement layer and said liquid barrier.

7. A hose claimed in claim 6 wherein said liquid barrier is a thin, flexible film formed of nylon fiber.

8. A hose as claimed in claim 6 wherein said moisture barrier is a polyvinylidene chloride film.

9. A hose as claimed in claim 6, wherein said moisture barrier is separated from said liquid barrier by said reinforcement layer.

10. A hose coupling for connecting a hose to a component of a refrigeration system, comprising:
a cap seal for coupling to the end of the hose, said cap seal including
  a base defining a seal opening,
  an outer wall extending axially from said base,
  an inner wall extending from said base concentric to said outer wall and encircling said seal opening,
  a lip seal bonded to said inner wall and extending across said seal opening, and
  a sealant space defined by said lip seal and said inner wall and containing sealing means for sealing said inner wall to the inner surface of said hose; and
a shell assembly for fitting over said cap seal and the end of the hose.

11. A device claimed in claim 10 wherein said shell assembly further comprises:
an outer shell having an open end and a closed end;
a hose tube extending through said closed end of said outer shell and into said hose concentric to said inner surface; and
said hose tube having a plurality of hose barbs on its outer surface.

* * * * *

UNITED STATES PATENT AND TRADEMARK OFFICE
CERTIFICATE OF CORRECTION

PATENT NO. : 5,040,830
DATED : August 20, 1991
INVENTOR(S) : Ward J. Atkinson

It is certified that error appears in the above-identified patent and that said Letters Patent is hereby corrected as shown below:

In column 3, line 41, change "contaminates" to --contaminants--.

In claim 6, line 9, change "reinfiorcement" to --reinforcement--.

In claim 10, line 12, delete "and".

Signed and Sealed this

Eighth Day of December, 1992

*Attest:*

DOUGLAS B. COMER

*Attesting Officer*  *Acting Commissioner of Patents and Trademarks*